United States Patent
Magee, Jr. et al.

(10) Patent No.: US 8,961,677 B2
(45) Date of Patent: Feb. 24, 2015

(54) SUSPENSION OF NANOPARTICLES AND METHOD FOR MAKING THE SAME

(75) Inventors: Walter L. Magee, Jr., Manitou Beach, MI (US); William J. Corbett, Harbor Springs, MI (US); Charlotte Corbett, legal representative, Harbor Springs, MI (US)

(73) Assignee: Silbond Corporation, Weston, MI (US)

( * ) Notice: Subject to any disclaimer, the term of this patent is extended or adjusted under 35 U.S.C. 154(b) by 2165 days.

(21) Appl. No.: 11/460,310

(22) Filed: Jul. 27, 2006

(65) Prior Publication Data
US 2007/0251418 A1    Nov. 1, 2007

Related U.S. Application Data

(60) Provisional application No. 60/794,845, filed on Apr. 26, 2006.

(51) Int. Cl.
| | |
|---|---|
| C04B 41/50 | (2006.01) |
| B24D 3/02 | (2006.01) |
| C09C 1/68 | (2006.01) |
| C09K 3/14 | (2006.01) |
| B82Y 30/00 | (2011.01) |
| C01B 33/14 | (2006.01) |
| C09C 1/28 | (2006.01) |

(52) U.S. Cl.
CPC .............. C09K 3/1463 (2013.01); B82Y 30/00 (2013.01); C01B 33/14 (2013.01); C01P 2004/03 (2013.01); C01P 2004/51 (2013.01); C01P 2004/64 (2013.01); C01P 2006/80 (2013.01); C09C 1/28 (2013.01)

USPC .............. 106/287.1; 51/307; 51/308; 51/309

(58) Field of Classification Search
CPC .......... C09G 1/02; C09G 1/04; C09K 3/1463; C09K 3/1409; C09K 3/1454
USPC .......................... 51/307, 308, 309; 106/287.1
See application file for complete search history.

(56) References Cited

U.S. PATENT DOCUMENTS

| | | | | |
|---|---|---|---|---|
| 4,344,800 A * | 8/1982 | Lutz | | 106/481 |
| 5,205,398 A * | 4/1993 | Hart et al. | | 198/780 |
| 5,709,639 A * | 1/1998 | Hart et al. | | 492/48 |
| 5,860,848 A * | 1/1999 | Loncki et al. | | 451/36 |
| 6,432,151 B1 * | 8/2002 | So et al. | | 51/308 |
| 6,527,818 B2 * | 3/2003 | Hattori et al. | | 51/308 |
| 6,855,335 B2 * | 2/2005 | Seok et al. | | 424/489 |
| 2004/0266613 A1 * | 12/2004 | Addiego et al. | | 502/302 |

* cited by examiner

Primary Examiner — Shuangyi Abu Ali
(74) Attorney, Agent, or Firm — Dickinson Wright PLLC

(57) ABSTRACT

A stable suspension of ethylpolysilicate nanoparticles having a size of between about 5 nm and 120 nm are in water and stabilized with between about 0.05 and 5 weight percent tetraalkylammonium hydroxide. The particles are between about 95% and 99.5% hydrolyzed and have superior removal rates when used in chemical mechanical polishing. A process for making ethylpolysilicate nanoparticles includes the step of adding reverse osmosis water and 25% tetramethylammonium hydroxide and ammonium hydroxide to a reactor, agitating the mixture and heating the mixture to about 80° C. Tetraethylalkoxy silane is added to the mixture and the mixture stirred and hydrolyzed. Ethanol is then removed. The mixture was then subjected to a vacuum to remove additional distillate. The material left in the reactor was then transferred to a plastic drum.

17 Claims, 8 Drawing Sheets

US 8,961,677 B2

SUSPENSION OF NANOPARTICLES AND METHOD FOR MAKING THE SAME

CROSS REFERENCE TO RELATED APPLICATION

This U.S. patent application claims priority to U.S. Provisional Patent Application Ser. No. 60/794,845 filed Apr. 26, 2006, the entire disclosure of the application being considered part of the disclosure of this application, and hereby incorporated by reference.

FIELD OF THE INVENTION

This invention relates to a stabilized suspension of nanoparticles and more particularly to a composition of ethylpolysilicate particles colloidally stabilized with tetraalkylammonium hydroxide dispersed in water. Such particles are particularly suitable for chemical mechanical polishing and planarization of the interlayers of integrated circuits, memory disks, optical lenses, etc. More particularly, the invention relates to spherical and near spherical ethylpolysilicate nanoparticles that when used as an abrasive media in chemical mechanical polishing, provide a rapid rate of material removal while producing surfaces, which are free from unacceptable gouges and/or scratches. The invention also relates to a stable aqueous dispersion of ethylpolysilicate nanoparticles which are essentially free of sodium, chlorine, lithium, and other contaminates and to methods for making stable dispersions of ethylpolysilicate nanoparticles.

BACKGROUND FOR THE INVENTION

The fabrication of integrated circuits includes a step of providing a substrate, such as a silicon or gallium arsenide wafer having a smooth uniform surface on one side thereof. Various layers, which are either conductive, insulating or semiconductor in nature are then formed on top of the smooth surface. In fabricating such circuits, it is also necessary to form conductive lines or similar structures above a previously formed layer. However, prior surface formations usually leave the top surface topography highly irregular, with bumps, areas of unequal elevation, troughs and other surface irregularities. As a result, global planarization is necessary to ensure adequate focal depth during subsequent photolithography, as well as removing any irregularities and surface imperfections during the various stages of the fabrication process. This planarization is generally accomplished by chemical mechanical planarization (CMP).

The process of chemical mechanical planarization is carried out using aqueous slurries of suitable chemicals and abrasive particles. The chemicals react with the surfaces being polished to form a reaction layer which is then abraded, or rubbed off, by the solid particles contained in the slurry. In many cases these particles are composed of silica. Heretofore, a type of silica known as fumed silica has been the principal source for these particles. Fumed silica is produced by the flame hydrolysis or burning oxidation of silane compounds such as $SiCl_4$, $HSiCl_3$, $CH_3$, $SiCl_3$, $CH_3$, $Si(OCH_3)$, and the like. The ultimate, spherical, silica particles produced by the flame hydrolysis or burning oxidation of silane compounds are very small, on the order of 10 to 20 nanometers.

These very small particles aggregate while molten and fumed silica is recovered as tightly bound, or fused, chain-like agglomerates of these ultimate particles. The effective particle diameter of these non-spherical agglomerates after dispersion into a CMP slurry is on the order of 100 nm. Both during the preparation of dispersions from these particles, and in their employment for CMP, the chain-like agglomerates are randomly fractured to produce asperities which can plow or dig into the surface being polished, producing undesirable gouges and scratches. Scratches and gouges remaining in the surface of an interlayer of an integrated circuit after planarization are extremely undesirable because they adversely affect the reliability of subsequent layers, acting as sources of defects and sites for contamination.

Also, the plowing or digging action of fumed silica particles results in some of the particles remaining partially embedded in the polished surface at the conclusion of the CMP process. Therefore, cleaning of the polished surface is difficult, often requiring vigorous mechanical brushing during the cleaning process. For example, particle contamination of the polished surface of a memory disc, can produce read/write errors. CMP slurries produced with fumed silica have an additional drawback in that they contain traces of chlorine resulting from the silica particles having been produced from chlorosilanes. Chlorides are an especially undesirable contaminant in integrated circuit manufacture.

In efforts to overcome the scratching, gouging and cleaning problems associated with fumed silica particles, spherical silica particles have been employed in CMP slurries. Such spherical particles have been obtained by the well-known technique of subjecting an aqueous sodium or potassium silicate solution to ion-exchange to produce ultrafine silica particles which are subsequently grown in size by Oswalt ripening, or by the hydrolysis of ethyl silicate using the so-called Stober process. The Stober process produces particles having a three-dimensional condensation structure. The Stober process is disclosed in an article "Controlled Growth of Monodispersed Silica Spheres in a Micron Range," by Stober et al published in the Journal of Colloid and Interface Sci. 26, 62-69 (1968).

While the use of such spherical particles reduces the scratching and cleaning problems associated with slurries made with fumed silica particles, the material removal rate of such slurries, for equal particle concentrations, is dramatically lower. This is associated, of course, with the fact that the removal rate of the chemically reacted layer is a function of the frictional force between it and the abrasive particle. While this reduced removal rate can be mitigated to a degree by significantly increasing the particle concentration of the spherical particles in the CMP slurry, this is at the expense of additional material cost, cleaning cost and spent-slurry disposal cost. Also, the slurries made from sodium or potassium silicate have these alkali metals as a contaminant, which are particularly undesirable in the manufacture of integrated circuits.

A further approach to solve the aforementioned problems is described in a U.S. Pat. No. 6,334,880 of Negrych et al. As disclosed therein, non-spherical particles having nodular morphology are used as an abrasive media in chemical mechanical polishing. Also disclosed are aqueous slurries of mono-dispersed non-spherical nodular shaped particles having mean effective diameters between about 100 and 300 nanometers for chemical mechanical polishing and aqueous slurries for the chemical mechanical polishing and planarization of oxide, dialectric, metal and metal/metallic compound interlayers of integrated circuits.

A more recent approach to silicate particles for polishing a semiconductor integrated circuit is disclosed in a U.S. Pat. No. 6,652,612 of Nakayama et al. As disclosed therein, silica particles for polishing have a three-dimensional poly condensation structure with an average particle diameter in a range of 5 to 300 nm. The silica particles have residual alkoxy groups therein and a carbon content in a range from 0.5 to 5 weight percent retained in the residual alkoxy groups.

Notwithstanding the above, it is presently believed that there is a commercial market for a stabilized suspension of nanopowders in accordance with the present invention. It is believed that there will be a commercial market for such products because they provide a smoother polished surface and a relatively good polishing rate without scratches and a more uniform particle size of between about 5 nm and 20 nm. Further it is believed that the rate of polishing is further enhanced by a mix of spherical and near spherical particles.

BRIEF SUMMARY OF THE INVENTION

In essence, the present invention contemplates a stable suspension of nanoparticles including ethylpolysilicate nanoparticles having a size of between 5 nm and 120 nm and preferably between 5 nm and 20 nm. The nanoparticles are dispersed in water and between about 0.05 and 5.0 weight percent of alkylammonium salt colloidally stabilizes the ethylpolysilicate nanopowders. In addition, the ethylpolysilicate particles are between about 95% and 99.5% hydrolyzed and have a zeta potential of about (5). Such particles have been found to have superior removal rates when used in chemical mechanical polishing without leaving gouges or scratches.

A second embodiment of the invention contemplates an abrasive media comprising ethylpolysilicate nanoparticles having a size of between 5 nm and 30 nm colloidally stabilized with tetraalkylammonium hydroxide in an amount of between 0.05 and 5 percent by weight and wherein the particles are between 95% and 99.5% hydrolyzed.

The invention will now be described in connection with the following figures.

DESCRIPTION OF THE PREFERRED EMBODIMENTS OF THE INVENTION

Figure 1A:
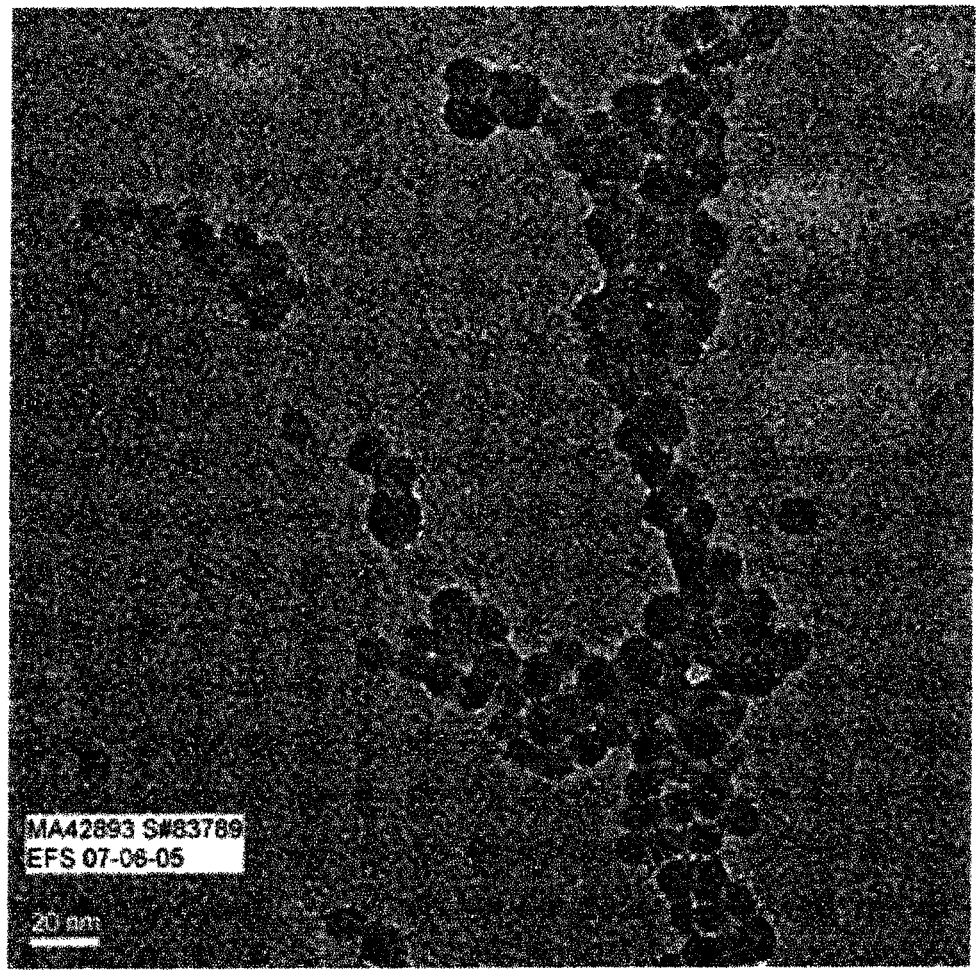
FIG. 1A is a scanning electron photo micrograph at 80,000× magnification which shows the ethylpolysilicate nanoparticles in accordance with the present invention.
Figure 1B:
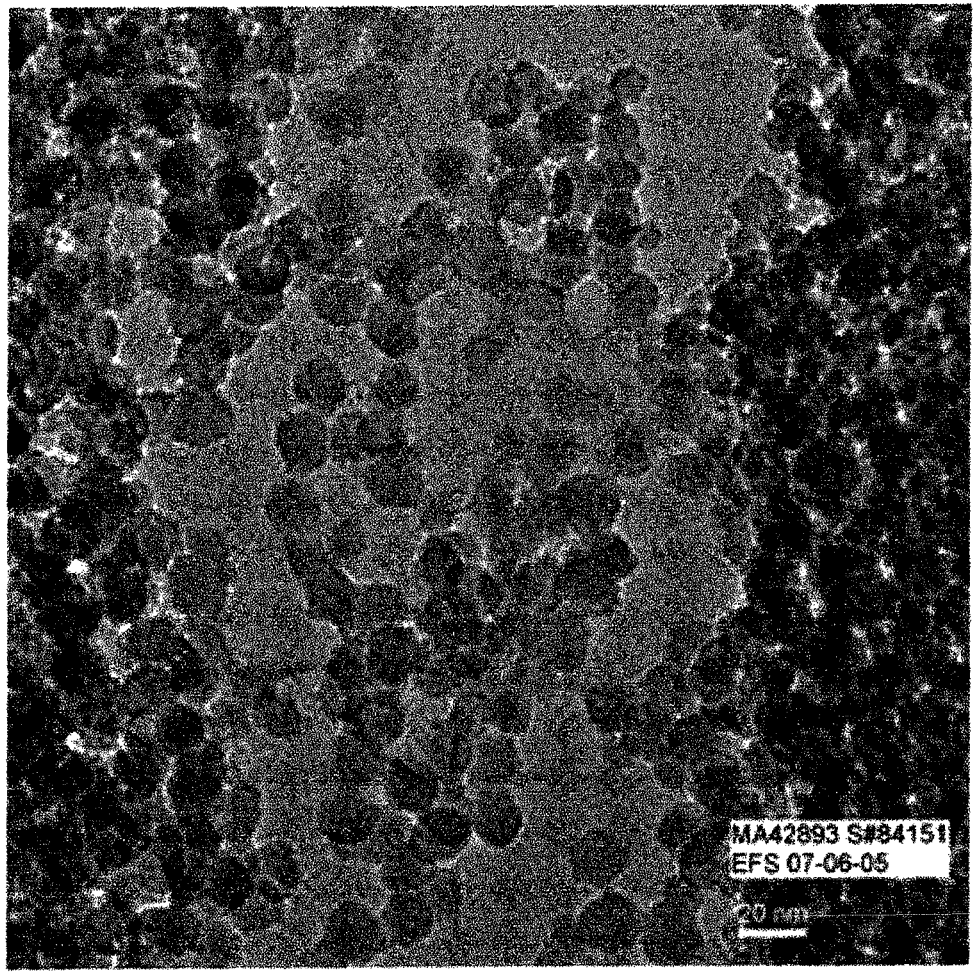
FIG. 1B is a scanning electron photo micrograph at 80,000× magnification which shows the ethylpolysilicate nanoparticles from a second sample in accordance with the present invention.
Figure 1C:
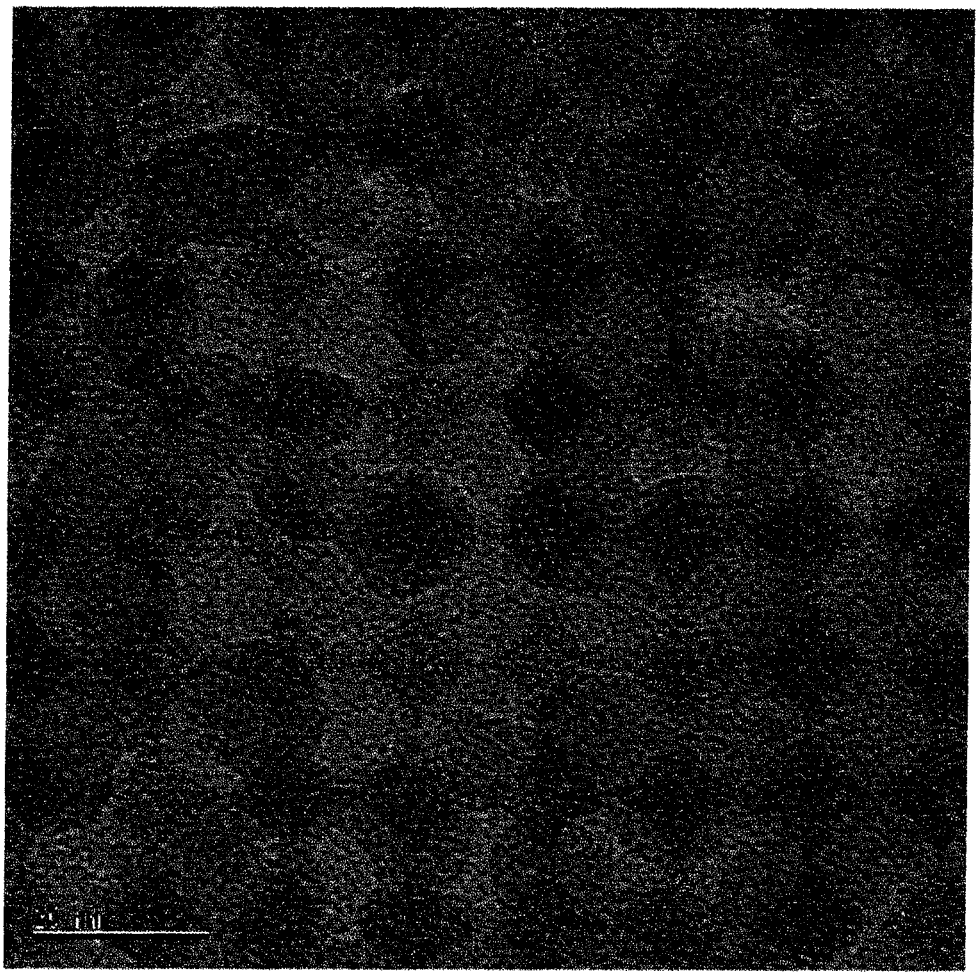
FIG. 1C is a scanning electron photo micrograph at 80,000× magnification which shows the ethylpolysilicate nanoparticles from a third sample in accordance with the present invention.

Chemical mechanical planerization is well established in the fabrication and integrated circuits. However, the microelectronic industry has a continuing need for lower cost and higher performance in fabrication processes. Circuit designs are becoming smaller with each improvement in technology. For example, it has been reported that 2006 is the year for 65 nanometer design introduction which will impose new levels of requirements upon the supply chain for electronic chemicals for the IC industry.

These new requirements will force suppliers to address key areas of quality and performance. For example, smaller particles sizes and narrower particle size distribution in abrasives are needed to permit thinner designs. There is also a need to eliminate trace metal impurities that interfere with circuit performance and for abrasives that reduce or eliminate defects in the form of unacceptable scratches.

The Asian microelectronics industry responded to the changing requirements by introducing new abrasives based on tetramethylorthosilicate (TMOS). These abrasives improved the level of metal contamination over fumed silica and sodium silicate based colloidal sols. The processes for producing the new abrasives are also capable of producing very small particles (10 to 300 nm) which permit thinner circuit designs and reduce scratches that result from larger particles present in fumed silica sols. The main drawback of TMOS based slurries is the hazardous air pollutant, by product methanol.

Silbond Corporation (the Assignee of the present application) has responded to the needs of the industry by developing new sols based on tetraethylorthosilicate (TEOS). These sols have the advantages of the TMOS produced sols without the hazardous air pollutant. In addition, the new process and sols disclosed herein address a major deficiency in earlier alkylsilicate based sols. Conventional technology for sol production is only capable of producing small particles at high dilutions. Accordingly, reactor efficiency is low and waste is high which increases costs. However, the new process disclosed herein dramatically increases the concentration of a new product and reduces the amount of waste.

A first new product in accordance with the present invention has a 20 nm average particle size, 20% by weight solids colloidal sol stabilized at a pH of 8. This sol shows promise in high pH formulations demonstrating high removal rates, small particle size and reduced metal concentration, dropping critical concentrations by an order of magnitude. A second product has an 80 nm average particle size, 20% solids colloidal sol, stabilized at a pH of 8. It gives the user the option of achieving the new industry standard with a slightly larger particle size. Nevertheless, with respect to removal rates, the smaller particle size disclosed herein compares favorably with an average particle size of about 120 nm for current fumed silica particles.

It should also be recognized that the products in accordance with the present invention are believed to be suitable for other applications. Because such products offer low PPB levels of alkali metal contaminants, new ceramic coatings and objects with greater thermal resistance may be capable of production. Further, low light absorbing impurities such as transition metals allow greater light transmission in fused objects to thereby allow higher quality optics with sol gel processing. Further, it is presently believed that the products disclosed and claimed herein open the door for the next microelectronics milestone of 45 nm which is due in 2009.

The compositions as disclosed herein are, like other silica compositions, three dimensional poly condensation structures. However, the claimed compositions have a particle diameter of from 5 to 120 nm and preferably from 5 to 30 nm with a narrow band of particle sizes. For example in one preferred embodiment of the invention, the average particle size is about 15 nm within a range of between about 5 to 28 nm. In another embodiment of the invention, the average particle size is about 80 nm. Such compositions have between about 2-4% by weight carbon and about 1% by weight nitrogen.

The compositions disclosed herein are distinguished over others by residual ethoxy groups as opposed to both methoxy and ethoxy groups in prior art compositions. Further, the compositions disclosed and claimed herein contain nitrogen in the form of tetramethylammonium salts of silicic acid. Accordingly, the presently disclosed compositions have new functional sites based on the TMAH. This provides a higher electrical charge on the particles providing greater stability. Further, the alkylammonium salt is preferably selected from the group consisting of trimethylcetylammonium hydroxide, benzyltrimethylammonium hydroxide and tetramethylammonium hydroxide. Tetramethylammonium hydroxide has been used in the preferred embodiments of the invention.

Almost all particulate material in contact with a liquid acquire an electronic charge on their surfaces. For example, the greater the charge density, the greater the stability, because the particles tend to repel one another and are less likely to form aggregations. Therefore, the charge density and surface chemistry are important considerations in selecting and using silca sols for chemical mechanical polishing. In effect, charge chemistry and surface chemistry can directly affect the performance of nanoparticles in the removal of metals and insulating inter-layers in fabrication of integrated circuits.

In a preferred embodiment of the present invention, the zeta potential was 5 while the zeta potential for conventional slurries is typically 2. In the present invention, the zeta potential was measured using Brookhaven Zeta Plus equipment. The Brookhaven Zeta Plus equipment measures the velocity of charged colloidal particles in solution. To be more specific a laser light passes through the sample suspension and is compared with the frequency of a referenced beam. The shift in the frequency, called a Doppler Shift, and the magnitude of the shift correspond to the polarity and the magnitude, respectively, of the electrophoretic mobility. The zeta potential is calculated from the solution conditions and the measured mobility. Because the zeta potential is based on a light scattering technique, this instrument can only be used to analyze suspensions with a very low concentration of particles. Therefore, the samples were diluted to make these measurements. For example, a small quantity of diluted suspension was introduced in the small container inside the equipment. As laser beam was passed through the solution, based on the above principle charge chemistry was calculated and curve matched to the line of least square fit. Charge density is expressed as the average of values obtained per cycle. The measurements are repeated after changing pH.

FIGS. 1A, B and C are photo micrographs of a mass of nanoparticles in a dilute specimen from a stable solution of nanoparticles in accordance with the present invention. These photo micrographs show the particles at 80,000 magnification. The particles have an average diameter of about 15 nanometers, carbon in an amount of about 2-4% by weight, nitrogen in the amount of about 1% by weight and sodium in the amount of about 0.5 ppm. The particles also exhibit an irregular or wavy surface.

Figure 2:
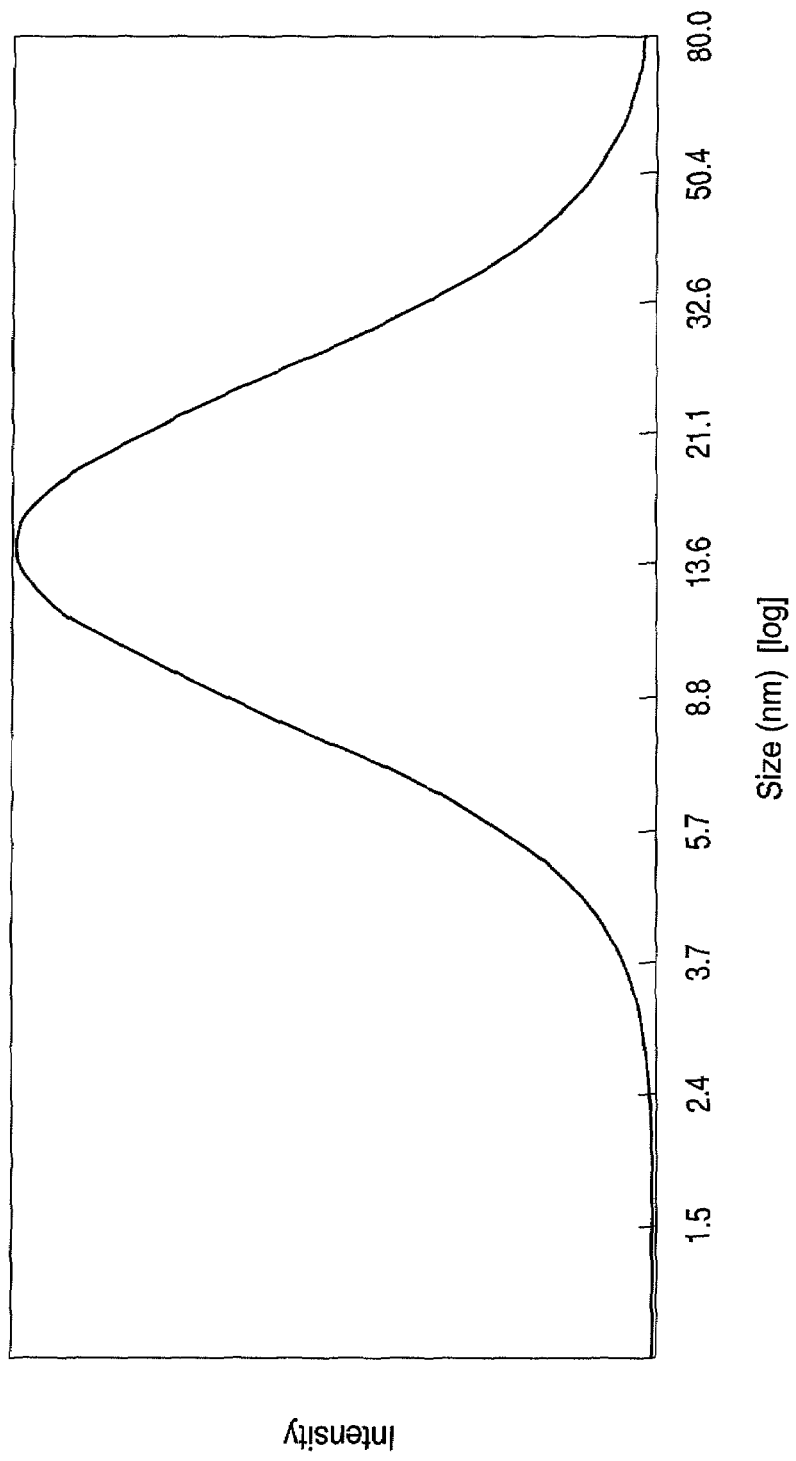
FIG. 2 is a unimodal distribution illustrating the particle size distribution in a stabilized suspension of nanoparticles in accordance with the present invention.

FIG. 2 illustrates a unimodal distribution of a further embodiment of the invention wherein the particles have an average particle size of about 16.4 nm and about 80% of the particles being between about 5 nm and 38 nm.

The metal impurities of 4 runs of products in accordance with the invention are shown in Table 1. However, it should be recognized that the amount of impurities is expected to be improved by the use of a carefully cleaned glass lined reactor.

TABLE 1

|      | #88506 | #88507 | #88508 | #88509 |
|------|--------|--------|--------|--------|
| (Al) | 15     | 14     | 12     | 13     |
| (Ca) | 320    | 100    | 50     | 140    |
| (Cr) | 5.1    | 4.4    | 3.2    | 4.3    |
| (Co) | 1.9    | 0.83   | 0.38   | 0.90   |
| (Cu) | 6.7    | 2.2    | <0.5   | 1.3    |
| (Fe) | 130    | 76     | 35     | 80     |
| (Li) | 6.1    | 5.0    | 2.7    | 4.4    |
| (Mg) | 36     | 11     | 4.3    | 15     |
| (Mn) | 10     | 8.1    | 5.9    | 7.7    |
| (Ni) | 4.6    | 2.8    | 1.8    | 2.8    |
| (K)  | 120    | 33     | 20     | 58     |
| (Na) | 870    | 420    | 200    | 460    |
| (Ti) | 14     | 13     | 14     | 13     |
| (Zn) | 32     | 7.1    | 32     | 26     |
| (Zr) | 17     | 2.4    | 2.4    | 6.1    |

Figure 3:
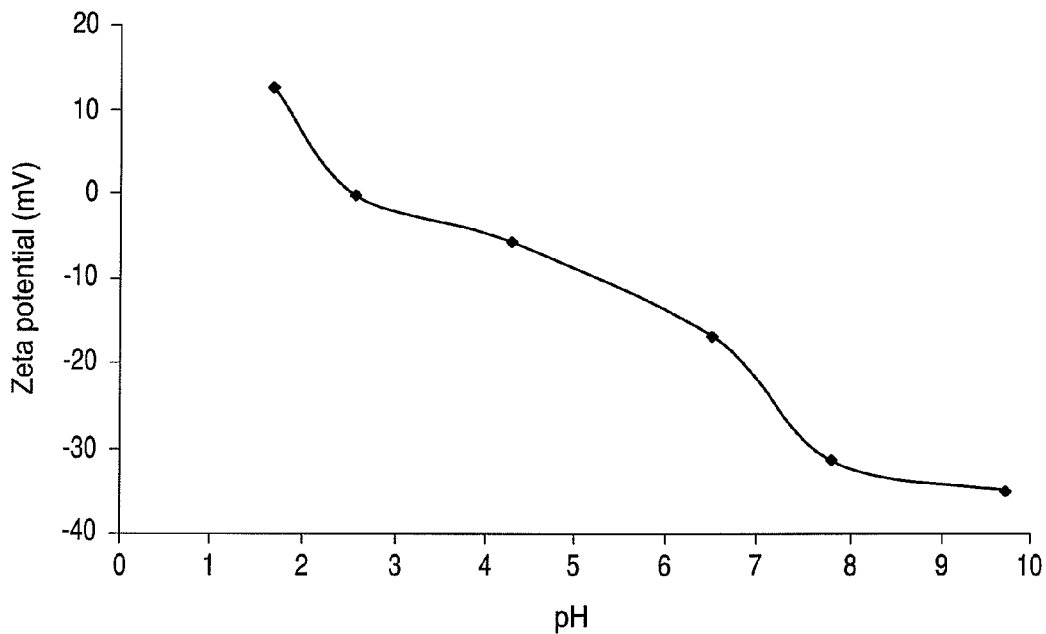
FIG. 3 a graphical representation of the zeta potential vs. pH for a prior art suspension of nanoparticles made from tetramethylortho silicate (prior art)

A graphical representation showing the zeta potential vs. the pH for a suspension of nanoparticles which were made from tetramethylortho silicate are shown in FIG. 3. The points on the graph are shown in the following table 2.

TABLE 2

| pH  | Zeta potential (mV) |
|-----|---------------------|
| 1.7 | 12.55               |
| 4.3 | −5.89               |
| 6.5 | −17.02              |
| 7.8 | −31.55              |
| 9.7 | −35.17              |

Figure 4:
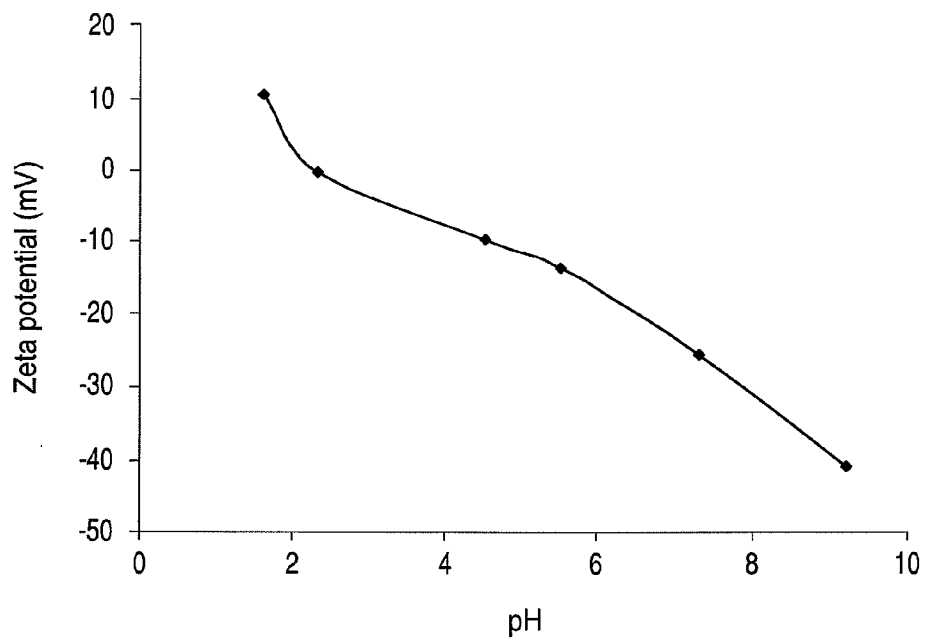
FIG. 4 is a graphical representation of a zeta potential vs. pH for another sample of the tetramethylortho silicate based nanoparticles (prior art)

A second example, of the zeta potential vs. pH for a tetramethylortho silicate based suspension of nanoparticles is shown in FIG. 4. The relationship of the zeta potential to pH is shown Table 3.

TABLE 3

| pH  | Zeta potential (mV) |
|-----|---------------------|
| 1.5 | 10.38               |
| 4.5 | −9.76               |
| 5.5 | −13.68              |
| 7.3 | −25.46              |
| 9.2 | −40.94              |

Figure 5:
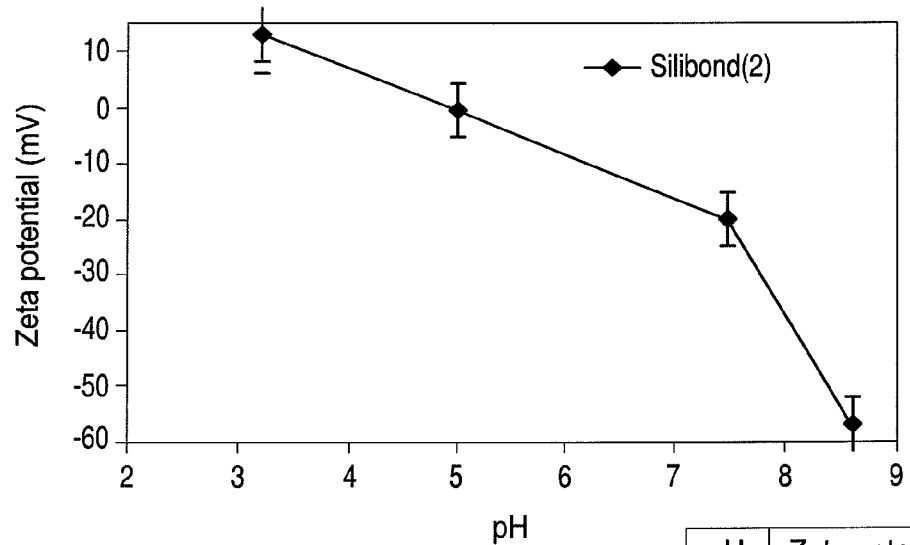
FIG. 5 is a graphical representation of a zeta potential vs. pH for a suspension of nanoparticles in accordance with the present invention.

Further the relationship between the zeta potential and pH for a stable suspension of nanoparticles in accordance with the present invention with an average particle size of about 20 nanometers is shown in FIG. 5. For comparison the actual values are shown in table 4.

TABLE 4

| PH  | Zeta Potential (mV) |
|-----|---------------------|
| 8.6 | −57                 |
| 7.5 | −20                 |
| 5   | −0.33               |
| 3.2 | 13.2                |

The particle size in accordance with a preferred embodiment of the invention ranges between about 5 nm and 25 nm and up to about 38 nm with an average particle size of about 15 nm. However, it another embodiment of the invention nanopowders were produced with an average particle size of about 80 nm and wherein essentially all of the particles are between about 60 nm and 120 nm.

The following examples are illustrative of the invention.

Example 1

1500 grams of Deionized Water is placed into a three necked 5 liter flask with 10 g of tetramethylammoniumhydroxide pentahydrate (Aldrich Chemical) and 350 milliliters of ammonia (24%). The mixture is heated to 83° C. and Tetraethylorthosilicate (Silbond Condensed) is added dropwise from an addition funnel over a period of 8 hours. If the temperature is allowed to rise such that volatile silicate species begin to co-distill (around 83° to 85° C.), then white particulate material forms on the side of the flask. This particulate material falls back into the solution and causes an undesirable particle size distribution. Care should be taken to ensure that the tetraethylsilicate remains in the liquid solution and converted to non-volatile particles. When all of the tetraethylsilicate is reacted and no volatile silicate is left, the mixture is heated to remove water. When the mixture reaches 100° C. the ethanol content was about 1% or less and the ammonia content was about 0.5% or less. The composition was found to be 20% by weight solids colloidal sol of nanoparticles with an average size of 15 nm as determined by a Beckman Coulter N5 particle size determination instrument. By freezing the mixture a solid material is isolated whose carbon content is 2%. This corresponds to an ethylpolysilicate that is 99% hydrolyzed.

Example 2

A 100 gallon glass lined reactor, fitted with a take off condenser, oil jacketed heating and an agitator, was charged with 401 pounds of reverse osmosis water, 10.92 pounds of 25% tetramethylammonium hydroxide available from Sachem, and 16.8 pounds of 29% AR grade ammonium hydroxide. The agitator was started and the mixture heated to 80° C. When the mixture reaches 80° C., Silbond Condensed TEOS was introduced into the heated mixture at a rate of 1.4 pounds per minute. When 270.5 pounds of TEOS were added (about 190 minutes), the mixture was stirred at 80° C. for 1 hour. The oil temperature was increased and hydrolyzed ethanol was removed for 490 minutes. A total of 321 pounds of material was removed. The measured material was cooled to 50° C. and then vacuum was applied to remove an additional 15 pounds of material by distillation. The material left in the reactor was transferred to a plastic drum. The product weighed 364 pounds. Using this procedure 4 consecutive runs were completed. The comparison of the 4 preparations is shown in Table 5.

It is also believed that zeta potential should range from about 4.5 to about 5.5.

In preparing suspensions in accordance with the present invention it is preferred that the ratio of the weight percent of ammonium to the weight percent of alkylammonium salt should be about 10:1. It is preferred that the stabilized suspension of nanoparticles contain about 18-22% silica, less than 200 PPB sodium and less than 10 PPB iron.

TABLE 5

Comparison of production runs of colloidal sols based on TEOS.

| Test                    | 88506 | 88507 | 88508 | 88509 |
|-------------------------|-------|-------|-------|-------|
| Alkalinity NH3 WT %     | 0.092 | 0.047 | 0.067 | 0.07  |
| Ethanol                 | 0.93  | 0.2   | 0.6   | 0.5   |
| PH                      | 7.73  | 7.74  | 8.2   | 7.92  |
| Specific Graviey 20° C. | 1.124 | 1.121 | 1.123 | 1.123 |
| Sears Surface Area      | 166   | 153   | 161   | 148   |
| SOLIDS %                | 19.7  | 19.2  | 19.4  | 19.4  |

These colloidal sols were analyzed for trace and metal content. The results are shown Table 6.

TABLE 6

|      | #88506 | #88507 | #88508 | #88509 |
|------|--------|--------|--------|--------|
| (Al) | 15     | 14     | 12     | 13     |
| (Ca) | 320    | 100    | 50     | 140    |
| (Cr) | 5.1    | 4.4    | 3.2    | 4.3    |
| (Co) | 1.9    | 0.83   | 0.38   | 0.90   |
| (Cu) | 6.7    | 2.2    | <0.5   | 1.3    |
| (Fe) | 130    | 76     | 35     | 80     |
| (Li) | 6.1    | 5.0    | 2.7    | 4.4    |
| (Mg) | 36     | 11     | 4.3    | 15     |
| (Mn) | 10     | 8.1    | 5.9    | 7.7    |
| (Ni) | 4.6    | 2.8    | 1.8    | 2.8    |
| (K)  | 120    | 33     | 20     | 58     |
| (Na) | 870    | 420    | 200    | 460    |
| (Ti) | 14     | 13     | 14     | 13     |
| (Zn) | 32     | 7.1    | 32     | 26     |
| (Zr) | 17     | 2.4    | 2.4    | 6.1    |

The metal impurity levels were believed to be satisfactory for new requirements in chemical mechanical planarization. In preparing the stabilized solution of nanoparticles, the agitation or stirring should be with sufficient shear to dissolve the tetraortho silicate in the mixture and continue until the tetraortho silicate amounts to about 40% by weight of the mixture plus the tetraortho silicate.

Example 3

Fifteen hundred grams of de-ionized water is placed into a three neck 5 liter flask with 10 g of tetramethylammonium hydroxide pentahydrate (Aldrich Chemical) and 350 milliliters of ammonia (24%). The mixture is heated to 50° C. temperature and tetraethylortho silicate (Silbond Condensed) is added drop wise at at rate of 9 g per minute. After three hours, the mixture begins thickening and showed signs if gellation. Eventually, the mixture gelled into a solid mass. Under this lower temperature condition the reaction mixture was not stable and produced a gel mass.

Figure 6:
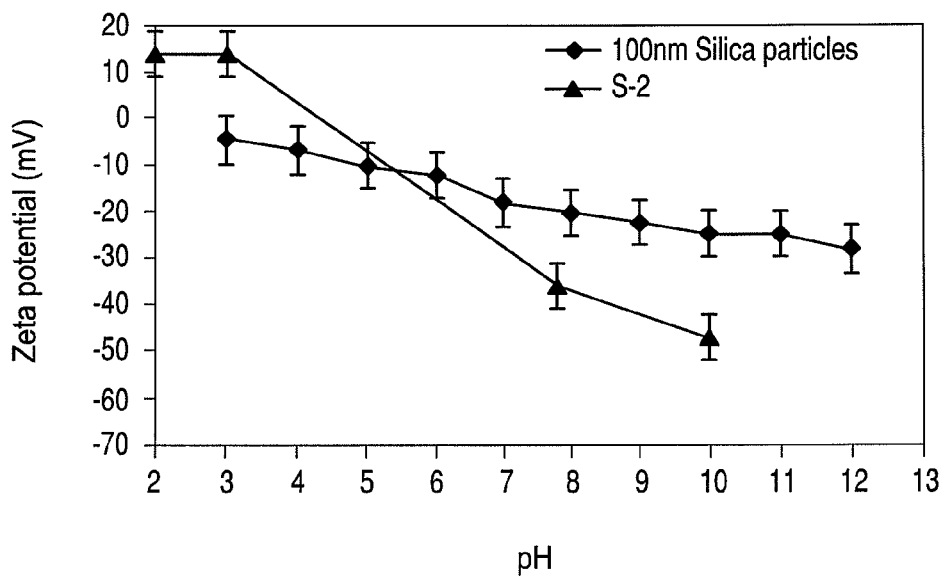
FIG. 6 is a graphical representation of a zeta potential vs. pH for a suspension of nanoparticles according to the present invention vs. prior art sodium silicate particles.

In FIG. 6, the curve 60 illustrates the relationship of zeta potential versus pH for a 100 nm sodium silicate particles. For contrast, the curve 62 illustrates the relationship of zeta potential versus pH for approximately 20 nm particles in accordance with the present invention.

Figure 7:
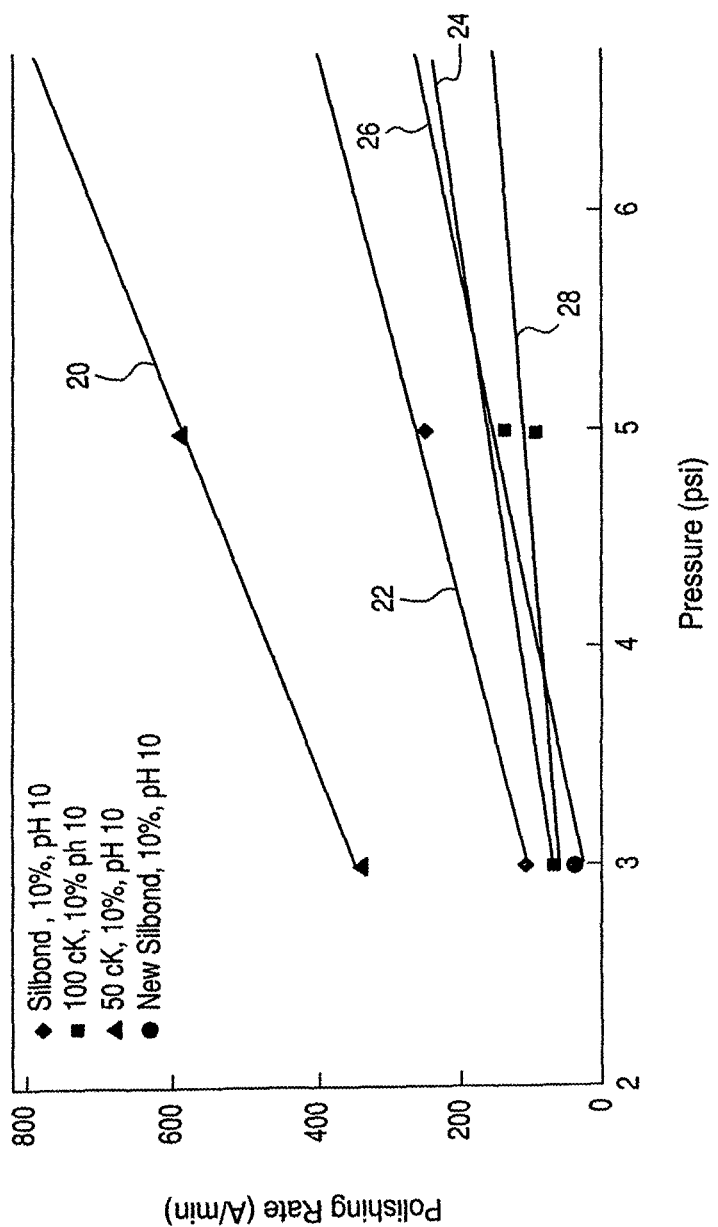
FIG. 7 is a comparison of the removal rate in anxtrum units per minute verses the pounds per inch pressure on a polishing pad using nanoparticle sols of different compositions.

In FIG. 7, curve 20 illustrates the polishing rate for sodiumsilicate sol with an average particle size of about 70 nm. A second curve 22 illustrates the polishing rate for a stabilized suspension of nanopowders in accordance with the present invention. For contrast, the curve 24 illustrates the polishing rate for a commercial alkyl silicate sol suspension of particles having a diameter of about 20 nm. A fourth curve 26 with a solid line represents the polishing rate for a suspension of particles from a second sample of a TMAH-TMOS solution. The final and lowest curve 28 illustrates the polishing rate for a sodiumsilicate sol with an average particle size of 30 nm. As illustrated, the removal rates between about 1 psi and 2 psi (type of pad and revolutions per minute) of concentration of particle and temperature.

Figure 8:
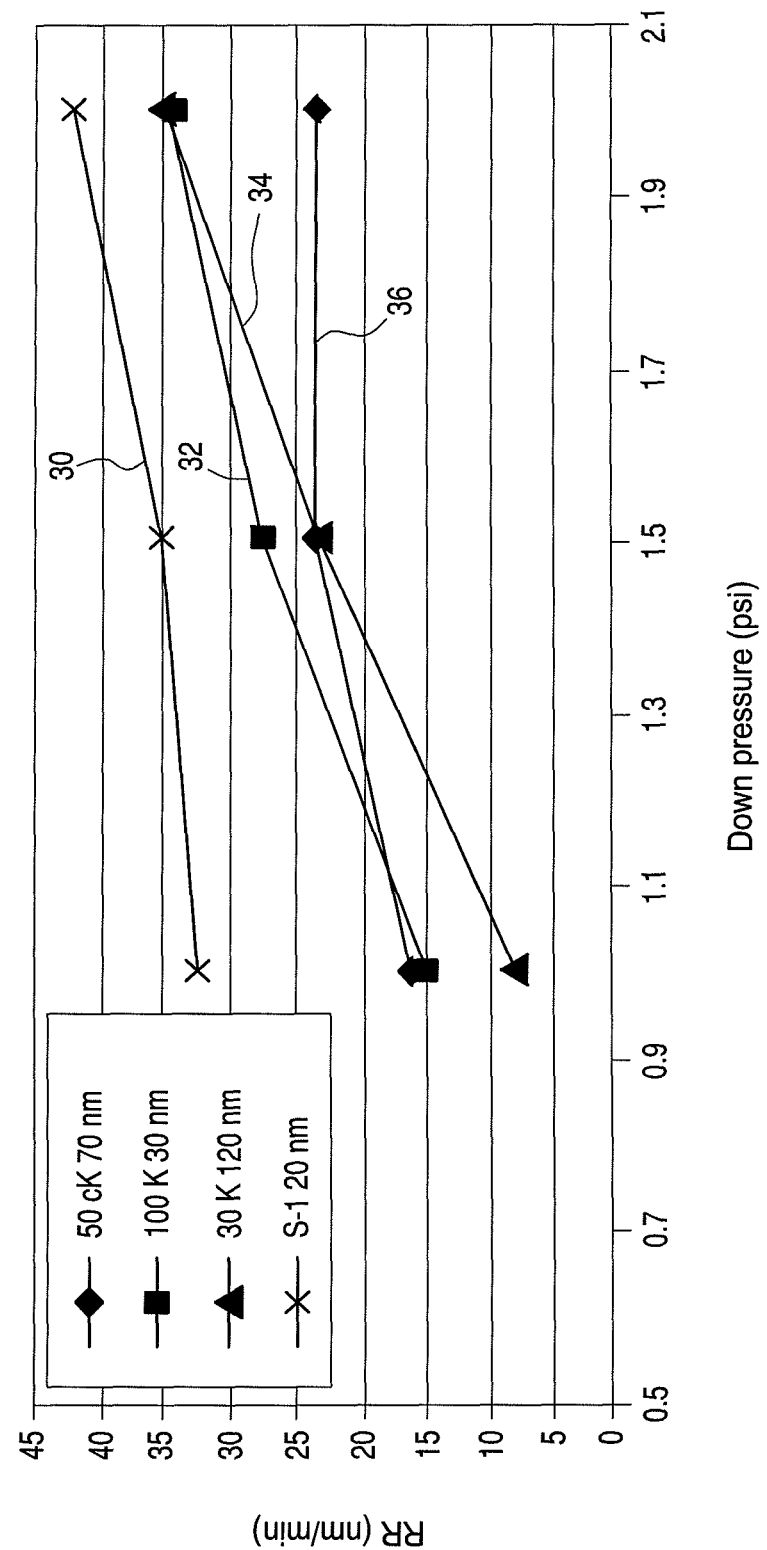
FIG. 8 is a further comparison of four sols including three sodiumsilicate sols and a stable suspension of nanoparticles according to the invention.

FIG. 8 is a comparison of three sols. For example, a curve 30 illustrating the polishing rate for a sol containing sodium silicate particles of about 30 nm and a curve 32 for a sol in accordance with the present invention. The removal rates are shown between about 1 psi and 2 psi. As shown by the curve 32 the rate of removal for the stable suspension in accordance with the present invention was greater than the rate of removal for 30 nm sodium silicate particles curve 36 and for 70 nm sodium silicate particles in curve 34.

While the invention has been described in connection with its preferred embodiments, it should be recognized that changes and modifications may be made therein without departing from the scope of the appended claims.

What is claimed is:

1. A stabilized suspension of nanoparticles as an abrasive media, said stabilized suspension comprising:
   water,
   nanoparticles of hydrolyzed ethylpolysilicate in said water,
   said nanoparticles of hydrolyzed ethylpolysilicate being between 95% and 99.5% hydrolyzed,
   said nanoparticles of hydrolyzed ethylpolysilicate having a size of between 5 nm and 25 nm,
   said nanoparticles of hydrolyzed ethylpolysilicate comprising a mix of nanoparticles having a spherical shape and nanoparticles having a non-spherical shape or wavy surface,
   said nanoparticles of hydrolyzed ethylpolysilicate being essentially free of sodium, chromium, lithium, iron, and other contaminants,
   an alkylammonium salt colloidally stabilizing said nanoparticles of hydrolyzed ethylpolysilicate, and
   said alkylammonium salt present in an amount between about 0.05% by weight and about 5% by weight of said suspension.

2. A stabilized suspension of nanoparticles according to claim 1 in which said alkylammonium salt is selected from the group consisting of trimethylcetylammonium hydroxide, benzyltrimethyl ammonium hydroxide and tetramethylammonium hydroxide.

3. A stabilized suspension of nanoparticles according to claim 2 in which said alkylammonium salt is tetramethylammonium hydroxide.

4. A stabilized suspension of nanoparticles according to claim 2, which includes sodium in an amount of less than 200 ppb.

5. A stabilized suspension of nanoparticles according to claim 2, which includes less than 10 ppb iron.

6. A stabilized suspension of nanoparticles according to claim 1 in which said nanoparticles of hydrolyzed ethylpolysilicate have an average particle size of about 15 nm.

7. A stabilized suspension of nanoparticles according to claim 1 in which said nanoparticles of hydrolyzed ethylpolysilicate have a zeta potential of between about 4.5 and 5.5.

8. A stabilized suspension of nanoparticles according to claim 7 in which said nanoparticles of hydrolyzed ethylpolysilicate have a zeta potential of about 5.

9. An abrasive media according to claim 1 in which a majority of said nanoparticles of hydrolyzed ethylpolysilicate have a non-spherical shape or wavy surface.

10. A stabilized suspension of nanoparticles according to claim 1, which includes less than 0.5% by weight ammonium.

11. A stabilized suspension of nanoparticles according to claim 1, which includes about 18 to 22% silica.

12. A stabilized suspension of nanoparticles as an abrasive media, said stabilized suspension comprising:
    water,
    nanoparticles of hydrolyzed ethylpolysilicate in said water,
    said nanoparticles of hydrolyzed ethylpolysilicate comprising a mix of nanoparticles having a spherical shape and nanoparticles having a non-spherical shape or wavy surface,
    said nanoparticles of hydrolyzed ethylpolysilicate being between 95% and 99.5% hydrolyzed,
    said nanoparticles of hydrolyzed ethylpolysilicate having a zeta potential of between about 4.5 and 5.5,
    an alkyl salt colloidally stabilizing said nanoparticles of ethylpolysilicate,
    silica in an amount of about 18 to 22%,
    sodium in an amount less than 200 ppb, and
    iron in an amount less than 10 ppb.

13. A stabilized suspension of nanoparticles according to claim 12, wherein said nanoparticles of hydrolyzed ethylpolysilicate have a size of between 5 nm and 120 nm.

14. A stabilized suspension of nanoparticles according to claim 13 in which said nanoparticles of hydrolyzed ethylpolysilicate have an average particle size of between about 60 nm to about 120 nm.

15. A stabilized suspension of nanoparticles according to claim 14 in which said nanoparticles of hydrolyzed ethylpolysilicate have an average particle size of about 80 nm.

16. A stabilized suspension of nanoparticles according to claim 15 in which essentially all of said nanoparticles of hydrolyzed ethylpolysilicate are between about 60 nm and 120 nm.

17. A stabilized suspension of nanoparticles according to claim 13 in which essentially all of said nanoparticles of hydrolyzed ethylpolysilicate are between about 5 nm and 38 nm.

* * * * *